(12) United States Patent
Rambler et al.

(10) Patent No.: US 9,400,907 B2
(45) Date of Patent: Jul. 26, 2016

(54) USER INTERFACE FOR AN OPTICAL CODE SCANNER

(71) Applicants: Jason Rambler, Decatur, GA (US); Peter Robert Charpentier, Suwanee, GA (US); Theodore Heske, III, Suwanee, GA (US)

(72) Inventors: Jason Rambler, Decatur, GA (US); Peter Robert Charpentier, Suwanee, GA (US); Theodore Heske, III, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 169 days.

(21) Appl. No.: 14/015,089

(22) Filed: Aug. 30, 2013

(65) Prior Publication Data
US 2015/0060552 A1    Mar. 5, 2015

(51) Int. Cl.
G06K 15/00    (2006.01)
G06K 7/10    (2006.01)

(52) U.S. Cl.
CPC .......... *G06K 7/10821* (2013.01); *G06K 7/1096* (2013.01)

(58) Field of Classification Search
USPC .............. 235/375, 383, 385, 462.01, 462.14, 235/462.43, 473
See application file for complete search history.

(56) References Cited

U.S. PATENT DOCUMENTS

| | | | |
|---|---|---|---|
| 5,410,108 A * | 4/1995 | Williams et al. ........... | 177/25.15 |
| 6,237,852 B1 * | 5/2001 | Svetal et al. ............. | 235/462.43 |
| RE40,071 E * | 2/2008 | Svetal et al. ............. | 235/462.43 |
| 8,833,659 B2 * | 9/2014 | McQueen et al. ............ | 235/454 |
| 2007/0102513 A1 * | 5/2007 | Scheb ........................... | 235/383 |
| 2010/0282850 A1 * | 11/2010 | Olmstead et al. ............. | 235/440 |
| 2011/0132985 A1 * | 6/2011 | McQueen et al. ............ | 235/454 |
| 2011/0232972 A1 * | 9/2011 | McQueen et al. ................ | 177/1 |
| 2013/0328682 A1 * | 12/2013 | Shearin et al. ............. | 340/572.3 |

* cited by examiner

*Primary Examiner* — Tuyen K Vo
(74) *Attorney, Agent, or Firm* — Harden E. Stevens, III; Andrew J. Thomson

(57) ABSTRACT

An optical code scanner is presented that includes an improved user interface and an improved external computer interface. The user interface includes illumination devices that illuminate an air gap between the edges of a weigh plate and the top surface of the optical code scanner. The illumination devices provide guidance to the operator that allows the operator to optimize scanning performance. The external computer interface exposes controls that allow an external computer to determine what information is displayed to an operator.

20 Claims, 6 Drawing Sheets

USER INTERFACE FOR AN OPTICAL CODE SCANNER

FIELD OF THE INVENTION

The present invention relates to optical code scanners and more specifically to aspects of improved user interfaces for use by optical code scanners.

BACKGROUND

Optical code scanners are used in point of sale (POS) terminals to read optical codes on items which are presented to the POS terminals for purchase as part of a purchase transaction. It may not be intuitively obvious to a first time or inexperienced operator how to properly move an item across an optical code scanner so that an optical code on the item can be read accurately and quickly. The internal process of reading an optical code is also complicated and hidden from the operator. To reduce costs to a retailer and the time required to process a purchase transaction, it is advantageous for operators of POS terminals to have an easy to use interface on the optical code scanner that guides and instructs the operator on the optimum method to scan items.

SUMMARY

Among its several aspects, the present invention seeks to overcome or ameliorate at least one of the disadvantages of the prior art, or to provide a useful alternative.

Among its several aspects, the present invention recognizes that a point of sale terminal must provide feedback and guidance information to an operator so the operator can determine when a function, such as an item scan, has been successfully performed. The invention recognizes that an operator can become confused or distracted when some feedback information is provided at one location while other related feedback information is provided at a different location. The invention further recognizes that providing operator feedback information at a single location improves the scanning performance of the operator.

Among its several aspects, the present invention recognizes that a point of sale terminal may include a device, such as an optical code scanner, that is purchased from one of multiple approved suppliers and where each supplier's device has a different user interface for providing operator feedback. The invention also recognizes that the point of sale terminal may use different models of the same devices from the same source where the models have differences in their user interfaces for providing operator feedback. Having a different user interface for different devices that perform the same function causes confusion and requires additional training for the operators. The invention further recognizes that the operator's performance can be improved and training reduced by providing standardized operator feedback information for any device that is performing the same function.

Among its several aspects, the present invention recognizes that a point of sale terminal can improve the performance of an operator by providing visual indicators on the optical code scanner. The visual indicators provide visual guidance to the operator on the proper use of the scanner and based on the actions of the operator, urges the operator to adjust their actions to reach optimal scanning performance. The visual indicators may suitably include a light display that indicates the best direction for scanning an item. Such as, left to right or right to left movement of items for scanning. Additionally, the light display provides a visual indication of the optimal speed to move an item across the scanner for scanning. An operator can optimize scanning performance by moving an item to be scanned across the scanner at a speed that matches the speed of the visual indication.

Among its several aspects, the present invention recognizes that a point of sale terminal can further improve the performance of an operator by providing an item guide and alert system on an optical code scanner. The item guide and alert system may suitably include a light apparatus that illuminates the perimeter of a weigh plate of the optical code scanner from underneath the weigh plate. The light apparatus changes colors and flashes as necessary to guide and alert the operator during item scanning and item weighing. In addition, portions of the light apparatus are individually controllable and are used to generate patterns of lights and simulate movement of lights.

In accordance with the teachings of the present invention, a point of sale terminal is provided that includes an optical code scanner. The optical code scanner communicates the current status of the scanner to the point of sale terminal. The current status includes feedback information that is provided to an operator such as a good or bad item read status. The optical code scanner will stop providing operator feedback information if it receives a command from the point of sale terminal to do so. The point of sale terminal may suitably command the optical code scanner to stop displaying some or all of the operator feedback information and then take responsibility for providing feedback information to an operator from a single location.

In accordance with an embodiment of the present invention, there is provided an optical code scanner. The optical code scanner comprises: a housing including a horizontal surface that includes an aperture; a weigh scale including a weigh plate located within the aperture where the weigh plate is mechanically isolated from the horizontal surface by an air gap between the edges of the weigh plate and the edges of the aperture; a plurality of illumination devices located within the housing and adapted to illuminate the air gap; an optical code scanning device located within the housing and adapted to read optical codes presented to the optical code scanner through an aperture in the weigh plate; a communications controller adapted to communicate over an external data bus; and a processor adapted to execute computer instructions stored in a memory where the computer instructions when executed by the processor cause the processor to control the optical code scanner and to perform the steps of: transmitting a status for each optical code read operation to the external data bus; and communicating information to an operator by controlling the plurality of illumination devices causing them to emit different patterns of light.

In accordance with an embodiment of the present invention, there is provided a method implemented by a processor in an optical code scanner. Such a method comprising: decoding data received from an optical code scanning device to read an optical code presented to the optical code scanner wherein the optical code scanning device captures light from the optical code through a horizontal scanning window located in an aperture in a horizontal surface of the optical code scanner; determining an optical code was successfully read and causing a plurality of illumination devices located below the horizontal surface and encircling the horizontal scanning window to emit a first sequence of light that is visible above the horizontal surface; transmitting status information about the optical code scanner on an external bus wherein the status information includes an item read status; and generating a moving light effect across a top portion of the horizontal surface using one of the plurality of illumination devices which is divided into multiple individually controllable light segments wherein the moving light effect is continuously generated when status information is not being displayed.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
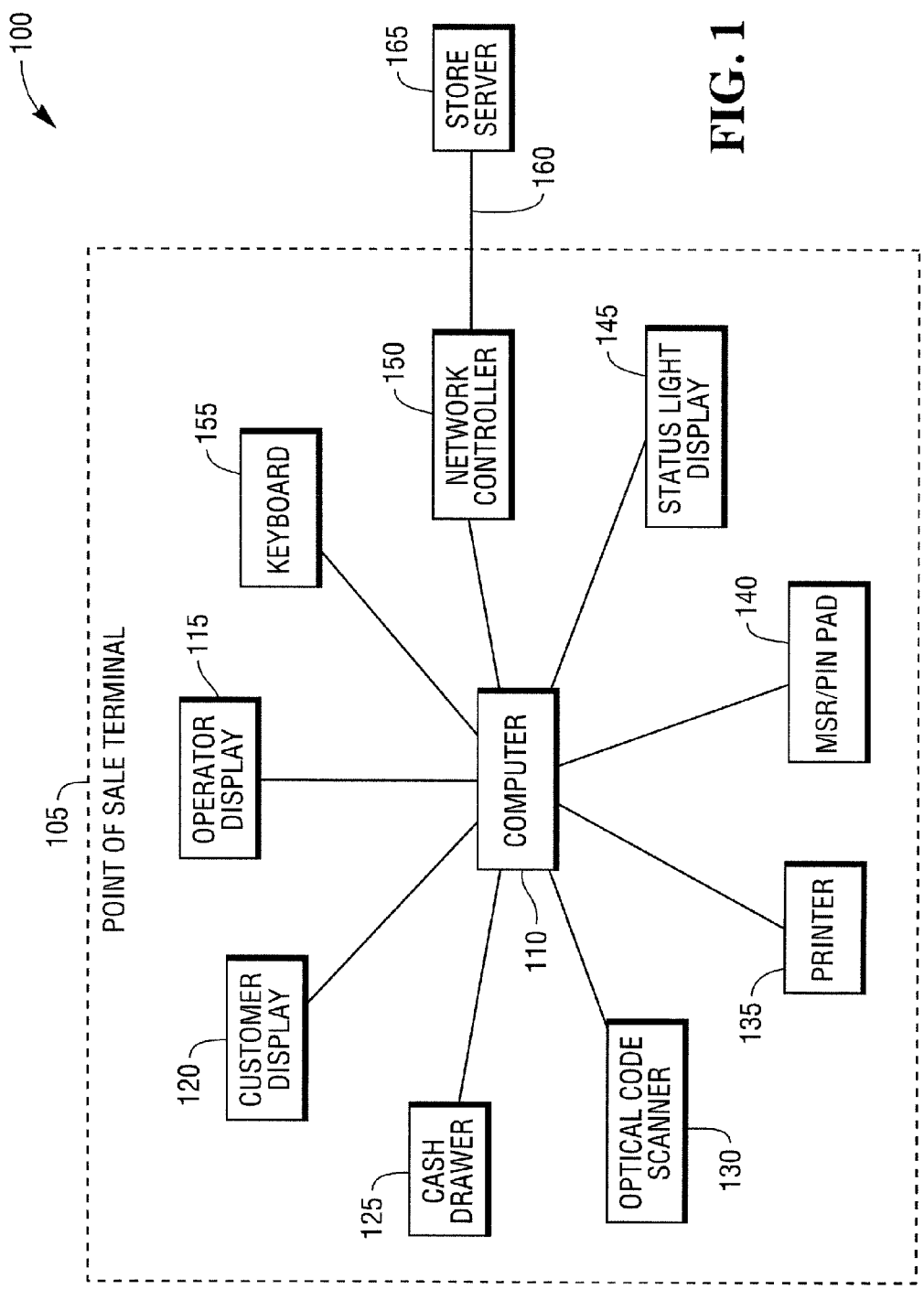
FIG. 1 is a high-level block diagram illustrating a retail point of sale system of the present invention.

With reference to FIG. 1, there is provided a high-level block diagram illustrating a point of sale system 100 including a point of sale (POS) terminal 105 that uses a network 160 to communicate with a store server computer 165. The point of sale system 100 may suitably include more than one POS terminal 105 where each POS terminal 105 communicates over the network 160 with the store server computer 165. The POS terminal 105 may be implemented as either an assisted or a customer operated (self service) POS terminal.

In this embodiment, the POS terminal 105 includes a computer 110 and a number of components and peripherals that are controlled by the computer 110. The POS terminal 105 further includes an operator display 115, a customer display 120, a cash drawer 125, an optical code scanner 130, a printer 135, a magnetic stripe reader (MSR), a personal identification number (PIN) pad 140, a status light display 145, a network controller 150 and a keyboard 155.

Figure 2:
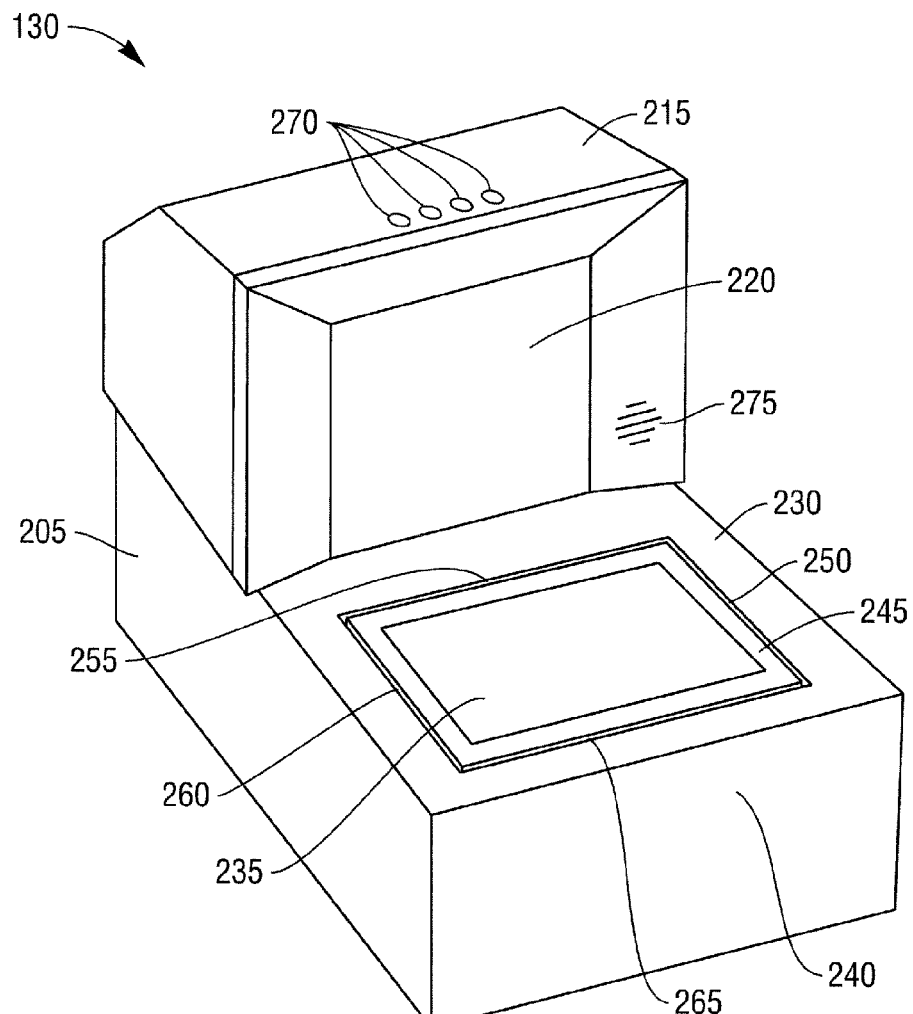
FIG. 2 is a high-level drawing illustrating an optical code scanner of the present invention.

In an assisted checkout embodiment, the operator display 115 displays information used by a cashier to operate the POS terminal 105. The cashier is a trained operator employed to, at least in part, operate the POS terminal 105. The keyboard 155 is used by the cashier to input data and commands to the computer 110. The cash drawer 125 is controlled by the computer 110 and stores currency, checks, coupons and the like. In some embodiments, the cash drawer 125 is replaced by an automatic cash acceptor/dispenser which is controlled by the computer 110 and accepts and dispenses currency. The optical code scanner ("scanner") 130 is used to read optical codes presented to the POS terminal 105 for identification. In some embodiments, the scanner 130 includes a weigh scale. The weigh scale determines the weight of an item placed on a weigh plate 245 (FIG. 2). The customer display 120 is visible to the customer and used to display information about the transaction to the customer. Self service versions of the POS terminals 105 do not include a customer display 120 because the customer is operating the POS terminal 105 and uses the operator display 115.

The network controller 150 has hardware and software necessary to support a connection to the local area network 160 and for the computer 110 to communicate over the local area network 160 to the store server 165 or other computers and POS terminals on the network 160 or to computers on other networks connected to the local area network 160. In some embodiments, the network controller 150 supports a transmission control protocol/internet protocol (TCP/IP) network protocol and the local area network 160 is an Ethernet network.

The MSR/PIN PAD 140 reads information from a magnetic stripe typically attached to the back of a card, such as a credit/debit card, loyalty card or the like. The PIN pad portion 140 is used to enter PIN numbers associated with a credit or debit card. The MSR/PIN Pad 140 device also includes software and hardware to communicate with an external server used to process credit transactions. The printer 135 is used to print customer receipts and other documents.

The status light display 145 is a dedicated display used to display status information related to the operation of the POS terminal 105 including the scanner 130. The status light display 145 provides a common location and interface for the POS terminal 105 to communicate status information to an operator that is using the POS terminal 105. The status light display 145 may suitably include independent lights or a screen display that can display text and graphics information.

The store server 165 includes software and data used to process purchase transactions being performed at the POS terminal 105. The data includes a product lookup database that is used to identify items presented to the POS terminal 105 for purchase. When an optical code is scanned by the POS terminal 105, information read from the optical code is sent to the store server 165 and used to identify a data record in the product lookup database. The data record includes information about the item the optical code is attached to including a price and description of the item. This information is returned back to the POS terminal 105 and is used to process a purchase transaction. The store server 165 also maintains information on all purchase transactions performed by the POS terminal 105 and can either process payment requests or contact external computer servers that will process the payment requests.

Referring now to FIG. 2, there is provided a high-level drawing illustrating an exemplar embodiment of the optical code scanner 130. The optical code scanner 130 reads optical codes presented to the optical code scanner 130. An optical code is a computer readable representation of information. In this embodiment, optical codes can be attached to or printed on an item or object or displayed on an electronic display such as the display screen of a cell phone or tablet computer. The optical code may suitably include one dimensional and two dimensional bar codes. The optical code scanner 130 can read optical codes based on symbologies that include but are not limited to: UPS, EAN, Code 128, GS1 DataBar™, Datamatrix, Aztec, QR and MaxiCode.

The scanner 130 is housed in a housing 205. The housing includes a vertical housing component 215 and a horizontal housing component 240. The horizontal housing component 240 includes a top horizontal surface 230. The horizontal scanning window 235 is located in an aperture of the top horizontal surface 230. The scanner 130 also includes a vertical scanning window 220 that is housed in the vertical housing component 215. The vertical scanning window 220 faces the operator side of the scanner 130. The two scanning windows 220, 235 are composed of an optically transparent scratch resistant material such as hurricane glass, sapphire coated glass or the like.

The horizontal scanning window 235 is part of a weigh plate 245. The weigh plate 245 is part of the weigh scale located within the horizontal housing component 240 and used to weigh items placed on the weigh plate 245. The weigh plate 245 is mechanically isolated from the housing 205 and supported by the weigh scale. A small air gap exists between the sides of weigh plate 245 and the top horizontal surface 230. The air gap provides mechanical isolation between the weigh plate 245 and the top horizontal surface 230. There is a top air gap 255, a bottom air gap 265, a right air gap 250 and a left air gap 260.

An operator scans an item by orienting an optical code on an item or a portable device so it faces either the vertical scanning window 220 or the horizontal scanning window 235 and then moving the item past the windows. The scanner 130 produces an indication, such as an audio sound, a light or both once the optical code has been identified and read. The scanner 130 uses imaging technology to capture an image of the optical code and decode or read it.

In some embodiments, the scanner 130 includes a plurality of indicator lights 270 that provide different scanner status indications. The indicator lights 270 emit different colors and are used to indicate certain status information that may suitably include power on, ready to scan, error conditions and the like. The scanner 130 further includes a speaker 275 that is used to communicate audio information to an operator.

In some embodiments, the scanner 130 also includes laser scanning technology that uses one or more lasers to scan and read an optical code. The laser beams from the laser are directed to form scanning patterns through the vertical scanning window 220 and the horizontal scanning window 235. When a directed laser beam strikes and moves across an object presented to the scanner 130, the object reflects a portion of the laser light. Some of the reflected laser light passes back through one of the scanning windows (220 or 235) and is directed to a photodetector that produces electrical signal data proportional to the amount of light received. The received electrical signal data is processed to detect the presence of an optical code and to recover the information associated with the optical code.

Figure 3:
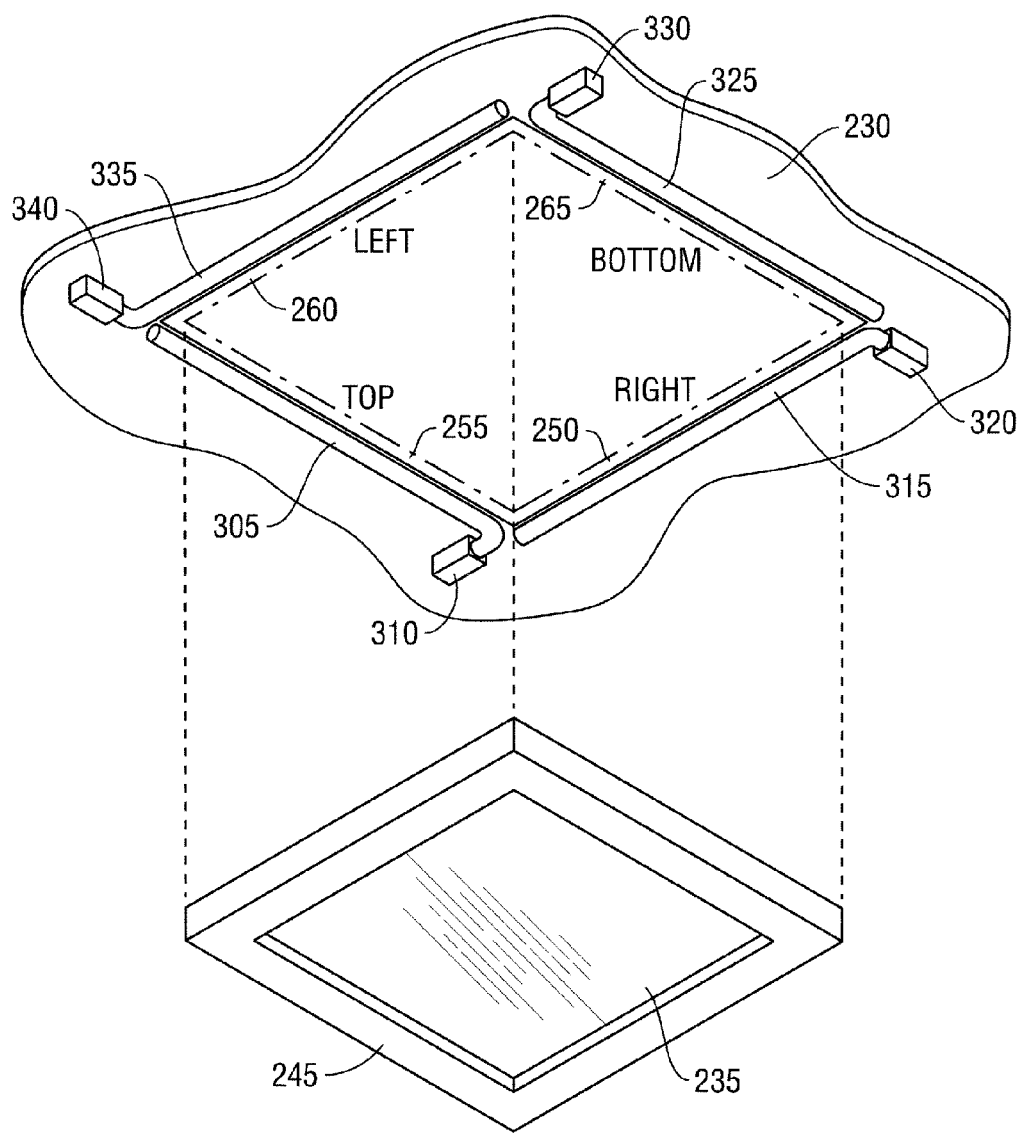
FIG. 3 is a high-level exploded view of the under side of the top horizontal surface and the weigh plate.

Referring to FIG. 3, there is provided a high-level exploded view of the under side of the top horizontal surface 230 and the weigh plate 245. The four air gaps 250, 255, 260, 265 are depicted between the top horizontal surface 230 the four sides of the weigh plate 245. Each of the four air gaps 250, 255, 260, 265 has a light pipe attached to the underside of the top horizontal surface 230 that is adjacent to and runs the length of the air gap. A top light pipe 305 is located next to the top air gap 255. A bottom light pipe 325 is located next to the bottom air gap 265. A right light pipe 315 is located next to the right air gap 250 and a left light pipe 335 is located next to the left air gap 260.

Each of the light pipes 305, 315, 325, 335 radially emits light along the length of the pipe. The emitted light is reflected through the adjacent air gap and is visible above the top horizontal surface 230 to the operator of the scanner 130. Each light pipe is attached to an illumination device that generates and directs light into the light pipe. A top illumination device 310 is attached to the top light pipe 305. A bottom illumination device 330 is attached to the bottom light pipe 325. A right illumination device 320 is attached to the right light pipe 315 and a left illumination device 340 is attached to the left light pipe 335. Each of the illumination devices 310, 320, 330, 340 includes a red, green and blue light emitter. The power output of each light emitter is independently controlled which allows any color to be generated. In this embodiment, each light emitter is an LED device. In some embodiments, a single device is used to generate all three colors.

In some embodiments, one or more of the light pipes 305, 315, 325, 335 are segmented light pipes. A segmented light pipe is a light pipe that is divided into multiple segments where each segment can be controlled and illuminated independently of the other segments. The multiple segments, each with the same or a different color, can be turned on together or a single segment can be turned on. When all segments of the light pipe are turned on at the same time with the same color, a segmented light pipe has the same appearance as a non-segmented light pipe. In this embodiment, a segmented light pipe has 10 independent segments and the top light pipe 305 is a segmented light pipe. In other embodiments, all of the light pipes 305, 315, 325, 335 are segmented light pipes. In still other embodiments, two light pipes are segmented.

When all the light pipes 305, 315, 325, 335 are turned on, the light generated by the light pipes 305, 315, 325, 335 is emitted through the air gaps 250, 255, 260, 265 to the top side of the top horizontal surface 230 and forms a continuous outline of the weigh plate 245. The emitted light can be programmed to be any color. The emitted light draws the attention of the operator to the weigh plate 245. This lighting technique can be used when an operator is required to place an item on the weigh plate 245. It can also be used by external security cameras (not shown) to identify the outline of the weigh plate 245. These security cameras are typically placed over the POS terminal 105 so they look down on the scanner 130. The security cameras can determine when an item is hanging over an edge of the weigh plate 245 because the item will block a portion of the light that is outlining the weigh plate 245. An item not completely on the weigh plate 245 can be mis-weighed which causes the POS terminal 105 to calculate a lower price for the item.

Figure 4:
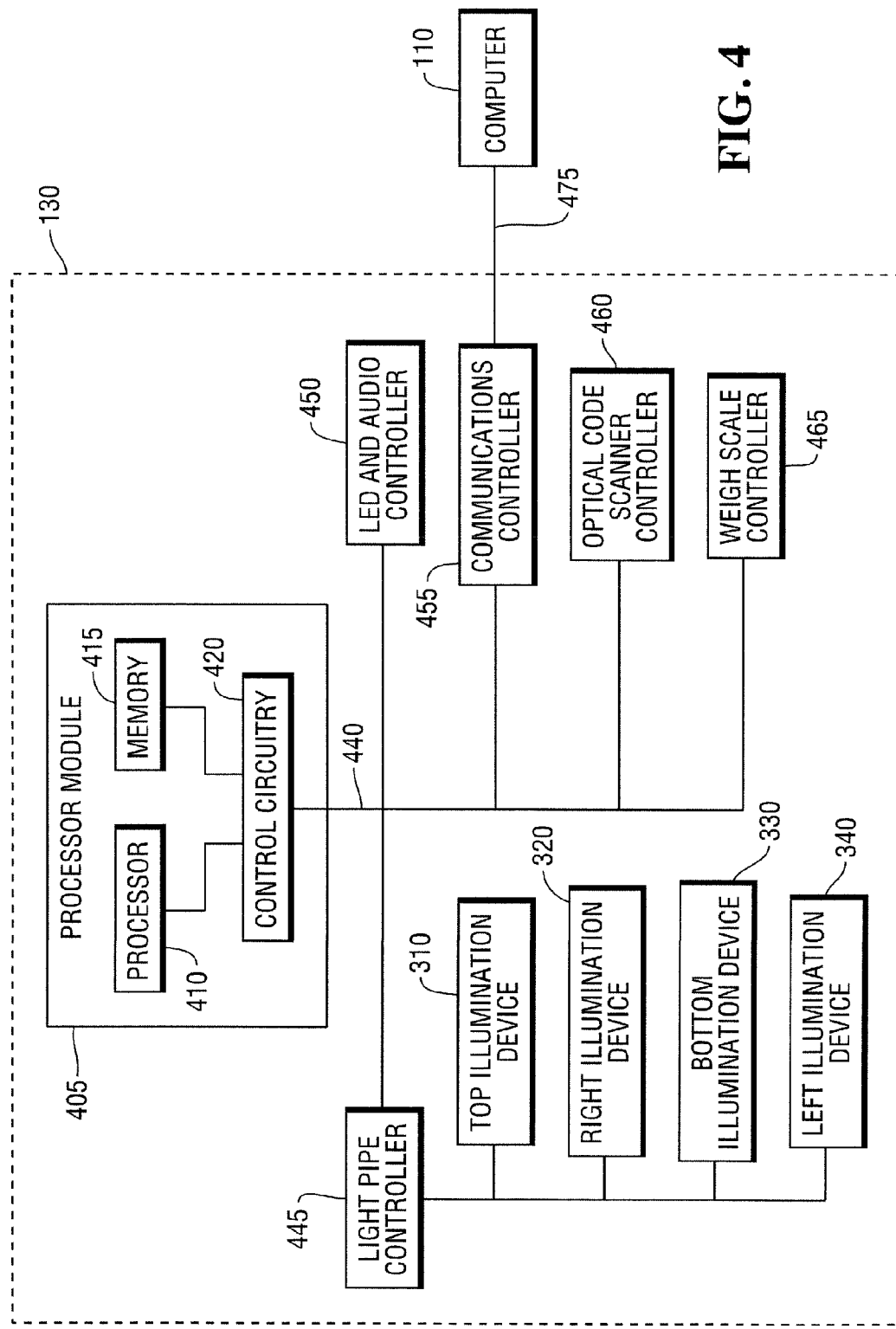
FIG. 4 is a high-level block diagram illustrating selected hardware components of the optical code scanner.

With reference to FIG. 4, there is provided a high-level block diagram illustrating an exemplar embodiment of certain hardware components of the scanner 130. The scanner 130 includes a processor module 405 which includes a processor 410, a memory 415, and control circuitry 420. The memory 415 is non-transitory and computer readable. The memory 415 includes both volatile and non-volatile memory. The processor 410 executes software stored in the memory 415 which causes the processor 410 to control the components of the scanner 130 and to implement the features and functions of the scanner 130.

The control circuitry 420 includes hardware interfaces between the processor 410 and the memory 415 and between the processor 410 and a bus 440 used to communicate with other components of the scanner 130. The scanner 130 further includes an LED and audio controller 450, a communications controller 455, an optical code scanner controller 460, a weigh scale controller 465 and a light pipe controller 445.

The communications controller 455 includes the hardware and software required for the scanner 130 to connect to and communicate over the network connection 475 to the computer 110. In some embodiments, the network connection 475 is implemented as a universal system bus (USB). In other embodiments, the network connection 475 is implemented as an RS-232 interface.

The LED and audio controller 450 transmits signals to the speaker 275 causing the speaker 275 to produce audible sounds. In this embodiment, the sounds are associated with different functions of the scanner 130 and are used to communicate information to the operator. The LED and audio controller 450 also controls the status lights 270 and causes them to turn on or off and to illuminate a desired color of light. The position and color of emitted light is associated with different status information.

The optical code scanner controller 460 controls the hardware used to read optical codes presented to the scanner 130. The optical code scanner controller 460 interfaces with one or more optical code scanning devices to receive data that represents an optical code presented to the scanner 130.

The weigh scale controller 465 controls the weigh scale and determines the weight of an item placed on the weigh plate 245.

The light pipe controller 445 independently controls each of the four illumination devices 310, 320, 330, 340. The processor 410 by interfacing with the light pipe controller 445 causes any of the light pipes 305, 315, 325, 335 to emit any available color at any desired intensity for any length of time. For a segmented light pipe, the processor 410 can turn one or more segments on or off and cause them to emit any available color at any intensity for any length of time. The processor 410 can further cause a segmented light pipe to generate a moving light effect where each adjacent segment is illuminated for a short time. For example, the first segment is turned on and off, then the second segment is turned on and off and so forth until the last segment is turned on and off. This creates a moving light effect. The frequency of the moving light can also be varied along with the color and intensity. The speed is used to teach the operator the optimum speed to move an item for scanning across the scanner 130. The direction of the moving light can be changed by starting with the last segment and moving to the first segment. This is just one of many different types of light displays that can be created by the processor 410 and the light pipes 305, 315, 325, 335.

The scanner 130 reads optical codes presented to the scanner 130 as part of purchase transactions. The goal of the scanner 130 is to read each optical code on the first pass by the scanner 130. If the scanner 130 fails to read an optical code on the first pass, the additional one or more passes required to read the optical code increase the time required to process the purchase transaction. Providing both audio and visual feedback to the operator with regard to reading optical codes increases the percentage of successful first pass reads by the scanner 130. In addition, the scanner 130 transmits the internal status of the scanner 130 and the status of optical code read operations to the computer 110 using the network 475.

In some embodiments, the computer 110 displays the status information from the scanner 130 on the status lights display 145. This provides a standardized status display that does not change when a different make or model of the scanner 130 is used or when an update to the scanner's 130 software changes the user interface. In other embodiments, when the status light display 145 is being used to display scanner 130 status information, the computer 110 sends a command to the scanner 130 causing the scanner 130 to stop displaying the status of optical code read operations on the scanner 130. The computer 110 can cause the scanner 130 to resume displaying the status of optical code read operations by sending the scanner 130 a command to resume displaying optical code read status.

The point of sale terminal 105 performs a purchase transaction where items are presented to the terminal 105 for identification and purchase. During the transaction, the operator may be required to place an item on the weigh plate 245 of the weigh scale. The computer 110 may suitably instruct the operator to place the item on the weigh plate 245 by displaying instructions on the operator display 115. The computer 110 provides additional guidance to the operator by sending a highlight scale command to the scanner 130. When the scanner 130 receives this command, it will interrupt any current display function and cause the four illumination devices 310, 320, 330, 340 to turn on and display a color. The light emitted by the four illumination devices 310, 320, 330, 340 highlights all four sides of the weigh plate 245. This aids the operator by outlining where the item should be placed. Once the weigh scale detects that a weight has been correctly placed on the weigh plate 245, the scanner 130 will stop highlighting the weigh plate 245 and the scanner 130 causes the four illumination devices 310, 320, 330, 340 to resume the interrupted display function. The color displayed is associated with the highlight function. In this embodiment, the color is white but other embodiments use different colors.

Figure 5A:
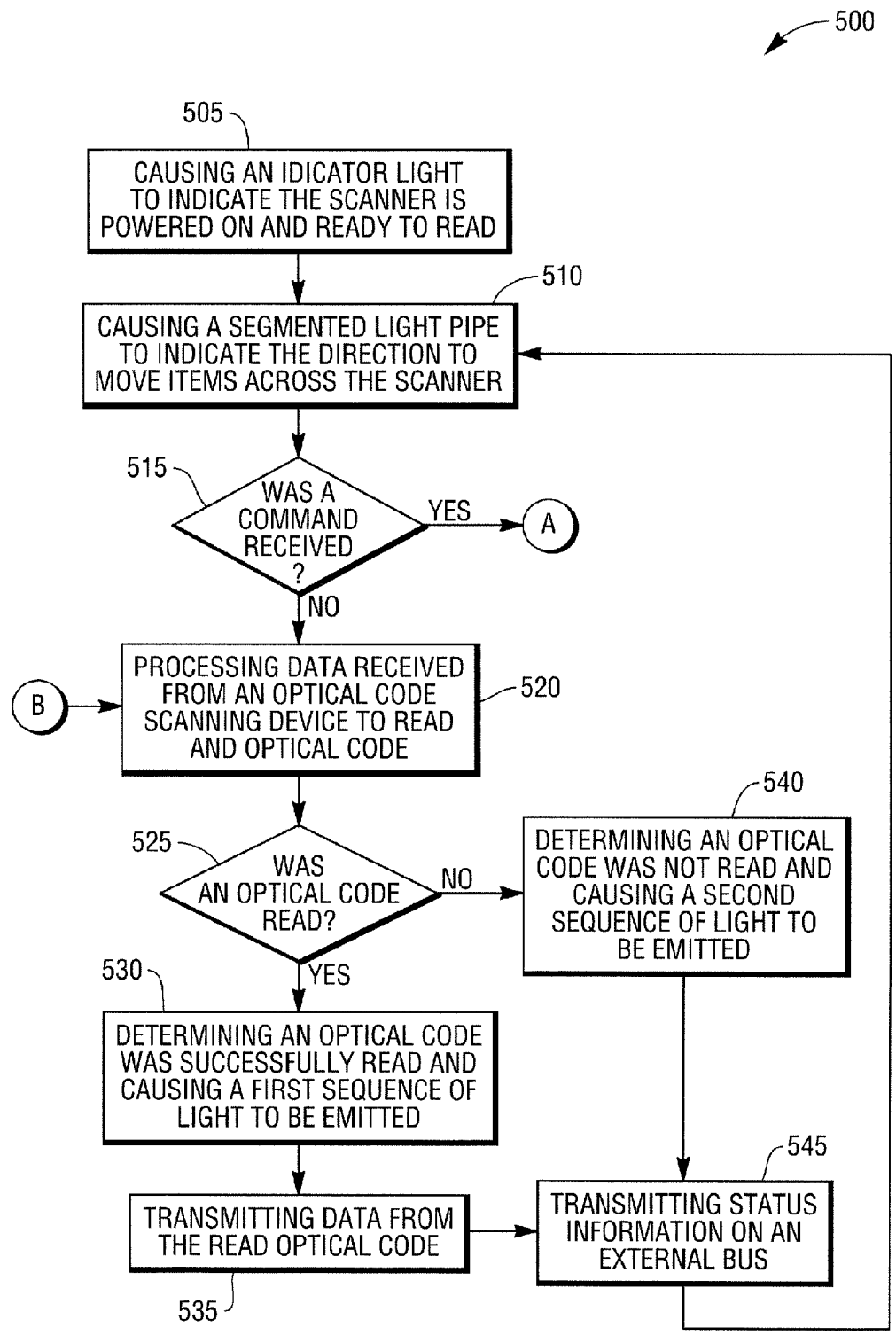
FIGS. 5A and 5B depict a high-level flow diagram illustrating a method of operating the optical code scanner.
Figure 5B:
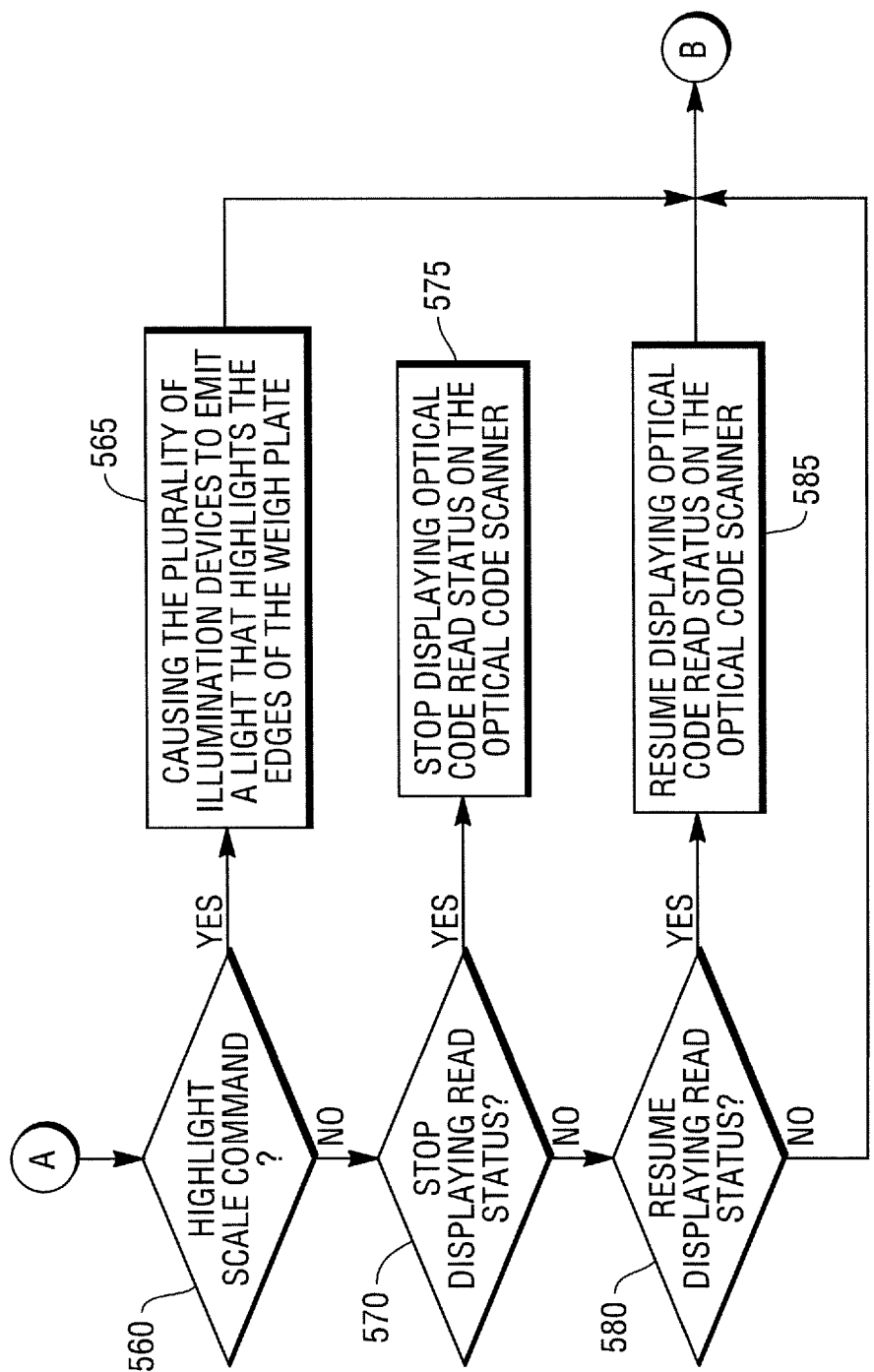

Turning to FIGS. 5A and 5B, there is provided a high-level flow diagram illustrating a method 500 of operating the optical code scanner 130. The following method describes one embodiment of the optical code scanner 130 and one example method of operating it. The method described below is suitably performed by the processor 410 in the optical code scanner 130 unless otherwise stated.

In step 505, the processor 410 performs a power up check of the scanner 130 and turns on one of the indicator lights 270 on the scanner 130 to indicate that the scanner 130 is powered up and ready to read optical code presented to the scanner 130. The powered up and ready indicator light emits a green color. The other indicator lights 270 are used to indicate other statuses, such as errors detected during the power up check of the scanner 130.

In step 510, the processor 410 causes the top illumination device 310 to generate a moving light effect. The top illumination device 310 controls the top light pipe 305 that illuminates the top air gap 255 across the top of the weigh plate 245. The moving light effect appears to be a single light that moves in one direction between two points. The effect is created by having multiple lights arranged side by side between the two points where each light is turned on and off in sequence with only one light on at time. The sequence starts by turning off all lights and then turning on and then off the light next to the starting point. The adjacent light is then turned on and then off. The sequence continues with each adjacent light being turned on and then off until the last light is turned on and then off. The sequence then repeats.

In this embodiment, the top light pipe 305 is a multi-segmented light pipe having ten individual segments where each segment is independently controlled by the top illumination device 310. The direction and speed of the moving light effect is controlled by the processor 410. The direction of the moving light is the direction the operator should move items across the scanner 130 for optimum scanning efficiency. The direction of the moving light can be either right to left or left to right. The speed of the moving light is the optimum speed to move an item with an optical code across the scanner 130 for reading. To obtain optimum scanning performance, the operator attempts to move items to be scanned across the scanner 130 at the same speed as the moving light.

In step 515, the processor 410 determines if a command has been received over the external bus 475 from the computer 110. If a command has been received, control is passed to section A found in FIG. 5B. If no command has been received, control is passed to step 530.

In step 530, the processor 410 processes data, that is received from the optical code scanning device located within the scanner 130, to decode and read an optical code. The optical code scanning device includes one or more image capture devices that capture images of items that are moved across the scanner 130. In some embodiments, the optical code scanning device also includes a laser scanning device that generates a pattern of laser light and captures laser light reflected from the item. In some cases, only a portion of an optical code is captured. In these cases, the processor 410 can detect the presence of an optical code but cannot accurately read the optical code. When this occurs, an item read status is set to show the read failed. If the optical code is correctly read, the item read status is set to show the read was successful.

When the read is successful, the processor 410 causes the four illumination devices 310, 320, 330, 340 to generate a first sequence of light that is associated with a successfully optical code read operation. To generate the first sequence of light, the processor 410 stops whatever display function the four illumination devices 310, 320, 330, 340 were performing and turns off all lights. The processor 410 then causes the four illumination devices 310, 320, 330, 340 to emit the first sequence of light which includes turning on all the light pipes 305, 315, 325, 335 and having them emit a green light for a short period of time. This generates a flash of green light around the weigh plate 245 and provides the operator with visual feedback that indicates a successful optical code read has occurred. Other embodiments use a different color of light or a different flash sequence.

In step 535, the processor 410 transmits data read from the optical code over the external bus 475 to the computer 110.

In step 540, the processor 410 determines that an optical code was not successfully read and causes the four illumination devices 310, 320, 330, 340 to generate a second sequence of light that is associated with an unsuccessfully optical code read operation. For this sequence, the processor 410 stops whatever display function the four illumination devices 310, 320, 330, 340 were performing and turns off all lights. The processor 410 then causes the four illumination devices 310, 320, 330, 340 to emit the second sequence of light which includes turning on all the light pipes 305, 315, 325, 335 and having them emit a red light for a short period of time. This generates a flash of red light around the weigh plate 245 and provides the operator with visual feedback that indicates an unsuccessful optical code read has occurred. Other embodiments use a different color of light or a different flash sequence.

In step 545, the processor 410 transmits status information on the external bus 475 to the computer 110. The status information includes operational information such as whether the last read operation was successful or unsuccessful. The computer 110 uses this and other information to display status information on the status light display 145. This information includes an indication of a successful or unsuccessful read operation. After this step, control passes back to step 510.

Section A of the method 500 is depicted in FIG. 5B. This part of the method decodes commands sent to the scanner 130. In step 560, the processor 410 determines if a highlight scale command has been received. If it has, control passes to step 565. Otherwise, control passes to step 570.

In step 565, the processor 410 causes the four illumination devices 310, 320, 330, 340 to turn on and emit a light through the light pipes 305, 315, 325, 335. The color of the light is white and light highlights the edges of the weigh plate 245. This light stays on until a command is received to turn off the highlight function or until a weight is placed on the weigh plate 245. The light is meant to direct the attention of the operator to the weigh plate 245 and to perform a weigh operation. In some embodiments, the color of the light is different.

In step 570, the processor 410 determines if a stop displaying read status command has been received. This command is used by the computer 110 to cause the scanner 130 to stop displaying visual indications of a read operation (successful or unsuccessful). If the command has been received, control passes to step 575. Otherwise, control passes to step 580.

In step 575, the processor 410 sets a parameter that stops the scanner 130 from displaying visual status indications of a read operation.

In step 580, the processor 410 determines if a resume displaying read status command has been received. This command is used by the computer 110 to cause the scanner 130 to resume displaying visual indications of a read operation. If the command has been received, control passes to step 585. Otherwise, control is passed to section B in FIG. 5A.

In step 585, the processor 410 sets a parameter that allows the scanner 130 to display visual status indications of a read operation.

Although the present invention has been described with particular reference to certain preferred embodiments thereof, variations and modifications of the present invention can be effected within the spirit and scope of the following claims.

What is claimed is:

1. An optical code scanner comprising:
a housing including a horizontal surface that includes an aperture;
a weigh scale including a weigh plate located within the aperture where the weigh plate is mechanically isolated from the horizontal surface on all sides by an air gap between the edges of the weigh plate and the edges of the aperture;
a plurality of illumination devices adapted to illuminate the air gap such that, for each side of the weigh plate, the portion of the air gap on that side is illuminated by a respective one of the plurality of illumination devices;
an optical code scanning device located within the housing and adapted to read optical codes presented to the optical code scanner through an aperture in the weigh plate; and
a processor adapted to execute computer instructions stored in a memory where the computer instructions when executed by the processor cause the processor to control the optical code scanner and to perform the step of:
communicating information to an operator by control ng the plurality of illumination devices causing them to emit different patterns of light.

2. The optical code scanner of claim 1, wherein the information comprises a status and wherein the processor is adapted to communicate the status to the operator by causing the plurality of illumination devices to emit a light sequence associated with the status.

3. The optical code scanner of claim 2, wherein the light sequence associated with the status includes emitting a light color associated with the status.

4. The optical code scanner of claim 3, wherein the status is an item scan successful status, the associated light color is green and the light sequence is a flash of all lights.

5. The optical code scanner of claim 3, wherein the status is an item scan failed status, the associated light color is red and the light sequence is a flash of all lights.

6. The optical code scanner of claim 3, wherein the status is a location status that highlights the location of the weigh plate and the light sequence is a steady illumination of ail lights.

7. An optical code scanner comprising
a housing including a horizontal surface that includes an aperture;
a weigh scale including a weigh plate located within the aperture where the weigh plate is mechanically isolated from the horizontal surface by an air gap between the edges of the weigh plate and the edges of the aperture;
a plurality of illumination devices located within the housing and adapted to illuminate the air gap;
an optical code scanning device located within the housing and adapted to read optical codes presented to the optical code scanner through an aperture in the weigh plate;
a communications controller adapted to communicate over an external data bus; and
a processor adapted to execute computer instructions stored in a memory where the computer instructions when executed by the processor cause the processor to control the optical code scanner and to perform the steps of:
transmitting a status for each optical code read operation to the external data bus; and
communicating information to an operator by controlling the plurality of illumination devices causing them to emit different patterns of light;
wherein the weigh plate has a rectangular shape and the air gap on each side of the weigh plate is illuminated by one of the plurality of illumination devices where each of the plurality of illumination devices is a light pipe that emits light radially along the length of the light pipe.

8. The optical code scanner of claim 7, wherein the one of the plurality of illumination devices that illuminates the air gap across the top side of the weigh plate includes multiple light segments where the light emitted by each light segment is independently controlled.

9. The optical code scanner of claim 8, wherein the processor implements a moving light effect across the top side of the weigh plate by turning off each light segment in the multiple light segments, then starting with an end light segment causing each light segment in turn to emit light for a time before being turned off.

10. The optical code scanner of claim 9, wherein the moving light effect moves across the top side of the weigh plate in the optimum scanning direction and the light moves at the optimum scanning speed.

11. A method implemented by a processor in an optical code scanner, the method comprising:
decoding data received from an optical code scanning device to read an optical code presented to the optical code scanner wherein the optical code scanning device captures light from the optical code through a horizontal scanning window located in an aperture in a horizontal surface of the optical code scanner;
determining an optical code was successfully read and causing a plurality of illumination devices located below the horizontal surface and encircling the horizontal scanning window to emit a first sequence of light that is visible above the horizontal surface;
transmitting status information about the optical code scanner on an external bus wherein the status information includes an item read status; and generating a moving light effect across a top portion of the horizontal surface using one of the plurality of illumination devices which is divided into multiple individually controllable light segments wherein the moving light effect is continuously generated when status information is not being displayed.

12. The method of claim 11, wherein generating the moving light effect includes moving the light in the optimum direction for the optical code scanner to scan items and the speed of the moving light matches the optimum speed for moving an item for scanning past the optical code scanner.

13. The method of claim 11, further comprising:
determining an optical code was not successfully read and causing the plurality of illumination devices to emit a second sequence of light that is visible above the horizontal surface.

14. The method of claim 13, wherein the first sequence of light includes flashing all of the lights and emitting a light color associated with a successful item read status and wherein the second sequence of fight includes flashing all of the lights and emitting a light color associated with an unsuccessful item read status.

15. The method of claim 11, wherein the horizontal scanning window is located within a weigh plate of a weigh scale and the weigh plate is located within the aperture in the horizontal surface.

16. The method of claim 15, wherein the plurality of illumination devices emit light through an air gap between the weigh plate and the edges of the aperture in the horizontal surface.

17. The method of claim 16, further comprising:
receiving a highlight scale command and in response causing the plurality of illumination devices to emit a light of a color associated with the highlight scale command to highlight the edges of the weigh plate.

18. A point of sale terminal system comprising:
a status light display adapted to display status information to an operator;
a computer adapted to execute software which when executed by the computer causes the computer to control the point of sale terminal including devices attached to the point of sale and to display status information from the devices on the status light display;
an optical code scanner in communications with the computer, the optical code scanner including:
a housing including a horizontal surface that includes an aperture;
a weigh scale including a weigh plate located within the aperture where the weigh plate is mechanically isolated from the horizontal surface by an air gap between the edges of the weigh plate and the edges of the aperture;
a plurality of illumination devices located within the housing and adapted to illuminate the air gap such that, for each side of the weigh plate, the portion of the air gap on that side is illuminated by a respective one of the plurality of illumination devices;
an optical code scanning device located within the housing and adapted to read optical codes presented to the optical code scanner through an aperture in the weigh plate; and
a processor adapted to execute computer instructions stored in a memory where the computer instructions when executed by the processor cause the processor to control the optical code scanner and to perform the steps of:
transmitting a status to the computer for each optical code read operation where the computer displays the status on the status light display; and communicating information to an operator by controlling the plurality of illumination devices causing them to emit different patterns of light.

19. The optical code scanner of claim 18 wherein the weigh plate has a rectangular shape and the air gap on each side of the weigh plate is illuminated by one of the plurality of illumination devices.

20. The optical code scanner of claim 19, wherein the one of the plurality of illumination devices that illuminates the air gap across the top side of the weigh plate includes multiple light segments where the light emitted by each light segment is independently controlled.

\* \* \* \* \*